United States Patent [19]

Bergström

[11] Patent Number: 4,560,865

[45] Date of Patent: Dec. 24, 1985

[54] OBJECTIVES PARTICULARLY FOR TELEVISION CAMERAS

[76] Inventor: Arne Bergström, Angsövägen 7, 180 10 Enebyberg, Sweden

[21] Appl. No.: 470,385

[22] Filed: Feb. 28, 1983

[30] Foreign Application Priority Data

Feb. 27, 1982 [GB] United Kingdom ............... 8205838

[51] Int. Cl.⁴ .................................................. H01J 31/50
[52] U.S. Cl. ............................ 250/213 VT; 313/371; 350/319
[58] Field of Search ............... 250/213 VT, 213 R; 350/319; 354/202, 288, 195.1; 313/371

[56] References Cited

U.S. PATENT DOCUMENTS

| | | | |
|---|---|---|---|
| 4,187,002 | 2/1980 | Roziere | 250/213 R |
| 4,254,437 | 3/1981 | Funk et al. | 250/213 R |
| 4,376,889 | 3/1983 | Swift | 250/213 R |
| 4,440,476 | 4/1984 | Jacobson | 250/213 VT |

OTHER PUBLICATIONS

*The Focal Encyclopedia of Photography*, 1971, pp. 1124–1125, McGraw-Hill.

*Primary Examiner*—David C. Nelms
*Assistant Examiner*—J. Jon Brophy
*Attorney, Agent, or Firm*—Walter C. Farley

[57] ABSTRACT

An objective, for example for a television camera, has a pinhole aperture (3) and an electronic image intensifier (5) arranged behind the aperture. The pinhole aperture gives extreme depth of field and the image intensifier has adequate gain to compensate for the low yield of the aperture. The aperture may be defined in an opaque layer deposited on a glass plate. The image intensifier may comprise a multichannel plate.

11 Claims, 3 Drawing Figures

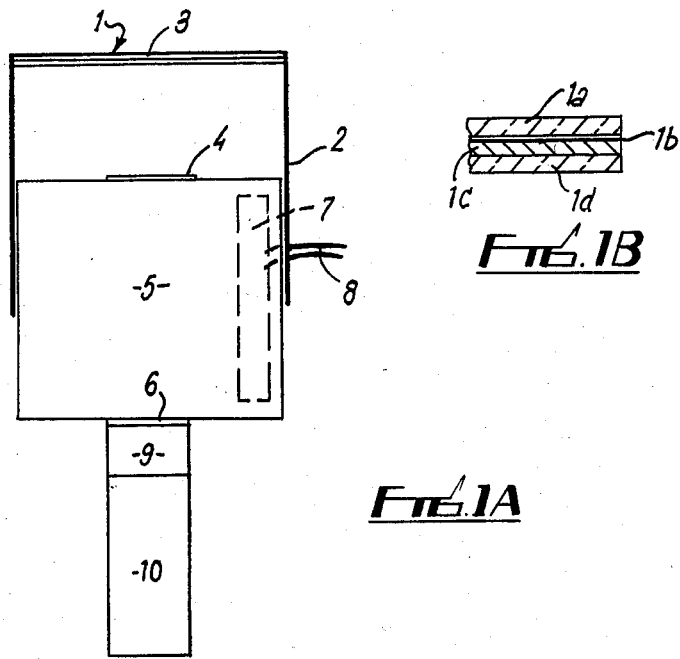
FIG. 1A
FIG. 1B
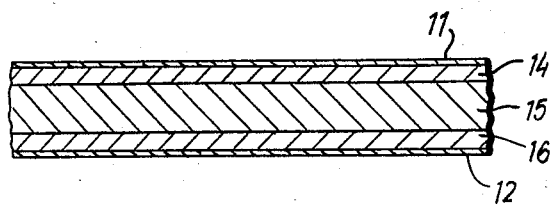
FIG. 2

OBJECTIVES PARTICULARLY FOR TELEVISION CAMERAS

This invention relates to objectives particularly although not exclusively for television cameras.

Presently-used objectives for television cameras are based on lenses which often are of very intricate designs and which can be produced at acceptable prices only because of remarkably sophisticated manufacturing techniques permitting lenses with extreme light-collecting properties and telescopic, wide angle and zoom lenses to be made routinely in large volumes.

There are, however, some applications where more extreme optical properties are required, and where alternative objective designs based on other principles might be of value.

One area in which objectives with special properties might be of great interest is in closed circuit television systems for, e.g. surveillance applications. Here one might find a requirement for a telescopic objective with extreme depth of field to enable details of distant objects to be surveyed whilst at the same time permitting scrutiny without refocusing of close objects, e.g. an identification tag only centimetres away, or a requirement for an extremely wide angle objective, which requirements are difficult to realise with conventional objective designs. It may also be a requirement that such an objective should be inconspicuous enough to escape ready detection.

An object of the present invention is to provide a new kind of objective design with the capability of meeting the above-mentioned requirements.

According to the invention therefore there is provided an objective comprising means defining a pinhole aperture and an image intensifier behind said aperture, said aperture being adapted in use to project an image on said intensifier and said intensifier being adapted to produce a corresponding output in response thereto.

By pinhole aperture is meant a lensless, or essentially lensless, aperture such as is known from the conventional pinhole camera.

The pinhole camera has been known since antiquity (camera obscura) and comprises an optical system with many advantages. For example, it is simple to manufacture (it need only involve a hole of the order of 0.1 mm), there need be no chromatic or spherical aberration, a depth of field from centimetres to infinity can be achieved, an enormous zoom range is possible down to extreme wide angle views which can hardly be realised by conventional lenses. The main disadvantage is the extremely low light yield (and a somewhat inferior resolution), which hitherto has limited the practical use of the pinhole objective (as an alternative to lens systems) for example to studies of especially bright events such as explosions in grenades and for diagnostic use in connection with nuclear explosions, etc.

With the present invention it has been found possible to overcome this disadvantage of the low light yield of the pinhole objective whilst retaining the advantages thereof, by use of the electronic image intensifier with which sufficient gain can be obtained to compensate for the low yield of the aperture. There are now electronic image intensifiers commercially available with gains of up to 100,000 times. An especially important advance in this field is the development of the microchannel plate, used in the second generation of image intensifiers, which is a wafer-thin sheet of glass with microscopic electron multiplicator channels, cf Scientific American November 1981, p46.

Even though today's image intensifiers are as expensive as high-quality conventional objectives, a mass production of microchannel image intensifiers is possible and may in the foreseeable future lead to competitive prices compared to conventional objectives. Also the developments in the field of charge coupled devices (CCD) are of potential interest in this respect. Objectives according to the invention might then afford a viable alternative to conventional lens systems and indeed they may be preferred due to their possible extreme optical properties.

Moreover the image intensifiers which are now commercially available contain integrated high-voltage driver circuits, and require only a low supply voltage of the order of 3 V which is available from a variety of small batteries. The power requirements are also low (below 100 mW).

In order to obtain good resolution, the pinhole diameter should be as small as possible compared to the image area. There is, however, a lower limit for the pinhole diameter due to Fresnel diffraction in the aperture. The optimum condition is when the pinhole diameter d is of the order of $d = \sqrt{RL}$, where L is a typical light wavelength and R is a typical distance from the pinhole to the image area, cf B Rossi, Optics, (Addison-Wesley 1957), sect. 4–6.

To get a resolution comparable to N lines on a television screen, the image diameter should be of the order of N times d. Assuming a picture angle of the order of 60° this gives an optimum value for the pinhole diameter of the order of $d = NL$.

The objective of the present invention is particularly suitable for use as the objective of a television camera and thus the image intensifier may be connected to a vidicon tube, although alternatively it may be connected to a photographic plate or to any other suitable means of utilisation of the image intensifier output.

The aperture may be defined by an aperture in an opaque layer on a surface of a transparent plate. This transparent plate may be bonded to a second transparent plate at that face thereof which has the said opaque layer applied thereto.

Matching screen plates divided into small filter areas of three complementary colours may be provided over, respectively, input and output windows of the image intensifier to give a colour facility.

The present invention will now be described further by way of example only and with reference to the accompanying drawings in which:

FIG. 1A is a diagrammatic sectional view of one form of an objective according to the invention;

FIG. 1B is an enlarged sectional detail of a portion of FIG. 1A; and

FIG. 2 is an enlarged sectional view of a detail of an alternative embodiment.

FIG. 1 shows an objective comprising a rigid glass filter 1 which is fitted over and covers one end of an open-ended opaque cylindrical housing 2. The glass filter consists of two glass discs 1a and 1d, glued together with a layer of epoxy resin 1c. One of the glass discs 1a is covered on its interjacent surface with a thin black layer 1b, which is completely opaque except in the centre where it has a small circular pinhole aperture 3 with a diameter of the order of 0.1 mm. The other disc 1d acts as a protective support for the layer. Preferably, the opaque layer 1b has a metallic ingredient and is deposited onto the glass substrate by an evaporation technique, and the circular aperture 3 is produced by a photolithographic method. It is important that care is exercised in manufacturing the pinhole so that reflections and light scattering in the pinhole itself, or its immediate surrounding, are eliminated.

Through the pinhole aperture 3, an inverted image of the outside world is projected on a fiberoptic input window 4 of a multichannel image intensifier plate 5 disposed within the cylinder 2 at the opposite end thereof to the filter 1. The image intensifier 5 contains an integrated high-voltage circuit (indicated diagrammatically at 7) powered by a low-voltage supply (via leads 8). Via an earthed-plane fiberoptic connection plate 9, a fiberoptic output window 6 of the image intensifier 5 is connected to the input surface of a conventional image vidicon tube 10 which is used in, e.g. a closed circuit television system for surveillance applications. The earthed-plane fiberoptic connection plate 9 is used because the input and output windows of the image intensifier become electrostatically charged during the operation of the intensifier, and this might otherwise disturb the vidicon tube and lead to damage of the multichannel plate. An embodiment is also possible in which the multichannel plate and vidicon are integrated into one unit and wherein the earthed-plane fiberoptic plate etc. is not required. Also embodiments incorporating intensified silicon-intensified target vidicons are possible.

The objective depicted in FIG. 1 will, within the pinhole resolution limits discussed above, produce a sharp image of all objects from infinity to about a centimetre from the objective without any focusing. Preferably, the cylindrical housing 2 can also be moved (e.g. by sliding the same axially relative to the image intensifier 5) so that the distance between the pinhole and the image intensifier can be changed, whereby zooming from telescopic to extreme wide angle views can be achieved. For extreme wide angle applications it is advantageous to have the fiberoptic input window 4 ground in the form of a concave spherical surface, whereby a picture angle of close to 180° can be achieved.

The embodiment of the objective as described above with reference to FIG. 1 gives only a black and white picture. FIG. 2 depicts an embodiment in which a colour representation can be obtained. In FIG. 2 a multichannel image intensifier plate 15 with its fiberoptic input and output windows 14 and 16 is supplemented by two matching colour screen plates, one (11) on the input window 14 and one (12) on the output window 16. The colour screen plates are divided into small filter areas of three complementary colours according to, e.g. the techniques used in colour television screens. It is observed that the resolution of the microchannel plate is normally a factor of about three better than the resolution of the pinhole objective, so the use of colour screen plates will normally not result in any appreciable degradation in the overall resolution of the objective.

I claim:

1. An objective comprising an opaque plate having front and back faces, a pinhole aperture in the plate through which light can pass, and an image intensifier having an input and an output, said intensifier being arranged in spaced disposition relative to the plate with said input facing said back face, and said pinhole aperture being arranged to produce an image at said input of a field of vision in front of the aperture, without any lens interposed between said pinhole aperture and said input, thereby to produce a corresponding intensified image at said output.

2. An objective according to claim 1 wherein said opaque plate comprises a transparent plate with an opaque layer on one surface, and wherein said pinhole aperture is defined by an aperture in said opaque layer.

3. An objective according to claim 2, wherein said opaque layer comprises a layer of evaporation-deposited material.

4. An objective according to claim 2 wherein said opaque layer comprises a layer of photolithographically deposited material.

5. An objective according to claim 2, wherein said transparent plate is bonded to a second transparent plate at said surface thereof.

6. An objective according to claim 2, wherein said transparent plate is a glass plate.

7. An objective according to claim 1, wherein the distance between said aperture and said image intensifier is adjustable to give a zoom function.

8. An objective according to claim 1, wherein said image intensifier comprises a microchannel plate.

9. An objective according to claim 1, wherein matching screen plates divided into small filter areas of three complementary colours are provided over, respectively, input and output windows of the image intensifier to give a colour facility.

10. An objective according to claim 1 in combination with a vidicon tube having an input surface, and optical coupling means for connecting said output of said image intensifier of said vidicon tube.

11. An objective according to claim 1 in combination with a vidicon tube having an input surface, wherein the output of said image intensifier is integrated with said input surface.

* * * * *